(12) United States Patent
Auslander et al.

(10) Patent No.: US 7,114,657 B2
(45) Date of Patent: Oct. 3, 2006

(54) FRAGILE WATER MARK PRINTED WITH TWO COMPONENT INKS AND PROCESS

(75) Inventors: Judith D. Auslander, Westport, CT (US); Robert A. Cordery, Westport, CT (US); Claude Zeller, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 127 days.

(21) Appl. No.: 10/737,325

(22) Filed: Dec. 16, 2003

(65) Prior Publication Data

US 2005/0127187 A1    Jun. 16, 2005

(51) Int. Cl.
G06K 19/06     (2006.01)
G06K 19/00     (2006.01)

(52) U.S. Cl. ..................... 235/491; 235/487
(58) Field of Classification Search ............... 235/435, 235/439, 468, 469, 487, 491; 283/113
See application file for complete search history.

(56) References Cited

U.S. PATENT DOCUMENTS 6,165,937 A * 12/2000 Puckett et al. ............. 503/201
6,530,601 B1 * 3/2003 Greene ......................... 283/57
6,685,094 B1 * 2/2004 Cameron .................... 235/468

* cited by examiner

Primary Examiner—Daniel Stcyr
Assistant Examiner—April A Taylor
(74) Attorney, Agent, or Firm—Ronald Reichman; Angelo N. Chaclas

(57) ABSTRACT

Improvements are provided in processing of documents to increase their security and/or decrease the complexity of testing for authenticity. Methods for printing documents with security markings and methods and apparatus for authenticating documents are described. In one aspect a document is printed with a security marking comprised of an image printed in at least two image segments. The image can be printed with an ink capable of forming images which are visible both to viewing under white light and as fluorescent images when irradiated with ultraviolet light, the segments having features of different sizes. The relative sizes of the two image segments will provide a detectable difference in fluorescent image sharpness. The apparatus provides means, all of which are simple and easily available for carrying out the methods.

8 Claims, 7 Drawing Sheets

FRAGILE WATER MARK PRINTED WITH TWO COMPONENT INKS AND PROCESS

BACKGROUND OF THE INVENTION

The invention relates to security markings; and, more particularly, to fragile watermarks employing inks having the ability to print images that can be viewed as visible images under white light illumination and as fluorescent images when irradiated with ultraviolet light. The invention makes practical use of a limitation of photosensitive optically variable (POV) inks or other inks which produce sharp visible images but less than sharp fluorescent images.

The use of watermarks per se has been available for centuries to provide desired, visible images for security and other purposes. Circumvention of these watermarks is a simple matter of using paper or printing to duplicate the mark. High-resolution scanners and printers, especially when coupled with reverse engineering, can be used to thwart many security markings, and advances in digital technology make security an increasingly difficult task. Fragile watermarks, ones that might not be recognizable to the eye and are not easily reproduced, are being introduced to provide additional levels of security.

Fragile watermarks are being developed to counter both software and hardware improvements in digital reproduction technology capabilities which, left unchecked, would soon make copying and counterfeiting most conventional images possible. A fragile watermark is an image with components, e.g., features that are difficult to undetectably duplicate. For instance, information in the form of a plurality of numbers and/or characters that represent some fact, i.e., date, etc., can be embedded in an image in a manner that the embedded information will change in appearance when the image is scanned or photocopied. In most cases, fragile watermarks can thwart copying efforts, but often require individual or time-consuming forensic evaluation. Unfortunately, sorting mail pieces or bank notes by the thousands cannot be simply accomplished with document by document evaluation.

Examples of fragile watermarks are found in several copending and commonly-assigned patent applications. The principles described in these and other patent documents provide useful procedures to enhance security of postal and other documents. It would be desirable to have a wide range of such procedures that could be used alternatively or in combination to decrease the incentive for counterfeiters to make unauthorized copies.

In U.S. Patent Application Pub. 20030052178, published Mar. 20, 2003, by Claude Zeller, Robert A. Cordery, Donald G. MacKay and William A. Brosseau, a Method for embedding information in an image is described. According to the disclosure, a composite image is produced that includes first and second images. The second image embeds information in the first image in a manner that the second image will change in appearance when the first and second images are scanned or photocopied.

In a related application, U.S. Patent Application Pub. 20030002711, published Jan. 2, 2003, Claude Zeller, Robert A. Cordery, Donald G. MacKay and William A. Brosseau, describe a method for reading information that has been embedded in an image. They proved a method for detecting a copy of a composite image that includes a first image and a second image. Information is embedded in the second image that will change in appearance when the first and second images are scanned or photocopied. This is accomplished by scanning the first and second images, and detecting a change in appearance of the second image that indicates the first and second images were scanned or photocopied.

In another related application, U.S. Patent Application Pub. 20020176114, published Nov. 28, 2002, Claude Zeller, Donald G. MacKay William Kilmartin, and William A. Brosseau, James Euchner and Robert A. Cordery, describe a method for utilizing a fragile watermark for enhanced security. According to this disclosure, a method is provided that detects when an image is copied or scanned in order to reduce the production of fraudulent images. This permits an inspector to conduct an analysis of an image with a simple set of tools on site without the need to check a remote database through a network and look for duplicate images. This minimizes the infrastructure and cost required to implement the system. A local inspection can be made by scanning an image and decoding it with relatively inexpensive tools available on site. The foregoing is accomplished by producing a fragile watermark image that produces a noticeable and measurable loss of information when it is reproduced. The loss of information is due to effects associated with scanning and printing processes.

U.S. Patent Application Pub. No. 20020195586 to Judith D. Auslander, John Griffiths and John Mama and U.S. Patent Application Pub. No. 20030041774 to Judith D. Auslander and Richard A. Bernard, describe inks for ink jet printing, which have the ability to print images that can be viewed as visible images under white light illumination and as fluorescent images when irradiated with ultraviolet light. These inks greatly facilitate high speed printing of documents such as mailpieces where this combination of properties has great utility. These photosensitive optically variable (POV) inks provide readable images due to both positive and negative contrast. The term negative contrast refers to the property of the fluorescent image being the reverse or negative of the visible image. Thus, where the dark printed ink is illuminated with white light, it appears as a positive image and the same image printed with a POV ink appears as the negative when illuminated with fluorescent-exciting radiation. The inks have been suggested as possibly useful for security purposes because of a strong need for printing security markings which exhibit high contrast, preferably black, and simultaneously exhibit fluorescence. These inks, however, have the disadvantage typical of fluorescent ink, especially those formulated for ink jet printing, that the sharpness of the fluorescent images has limitations when the print size is reduced too much or the print pattern becomes too complex. It would be desirable to provide a security system utilizing POV inks that practical resolution problems associated with fluoresced images where image features are too small or closely spaced.

U.S. Patent Application Pub. No. 20030005303 to Judith D. Auslander, Robert A. Cordery and Claude Zeller, describes a method and system for validating a security marking that can use inks of the type above. That method includes the steps of acquiring a first image of the security marking in the visible wavelength range under illumination of visible light, also acquiring a second image of the security marking from the fluorescent emission under excitation illumination, and using the first and second images to verify authenticity of the item. The method does not require high-resolution fluorescent images, and use of POV inks in the production of fragile watermarks would seem a use unattainable. The inventors note therein that the prior art has provided inks for rotary and other letter press postage meters to imprint indicia on envelopes with platens using ink impregnated into foam or other porous media. Red-fluorescent, colored inks have been made for letterpress meters and include red, blue, green and black inks. For example, U.S. Pat. Nos. 2,681,317, 2,763,785, 3,230,221, 3,560,238, 3,928,226 and 4,015,131 disclose such red-fluorescent inks.

Presently, security markings can be produced with fragile watermarks or with POV ink, but the advantages or manner of combining the methods have not been previously recognized. There remains a need for fragile watermarks that are simple to print and to test.

BRIEF DESCRIPTION OF THE DRAWING

The invention will be better understood and its advantages will become more apparent from the following description, especially when read in light of the accompanying drawing, wherein.

SUMMARY OF THE INVENTION

Figure 1:
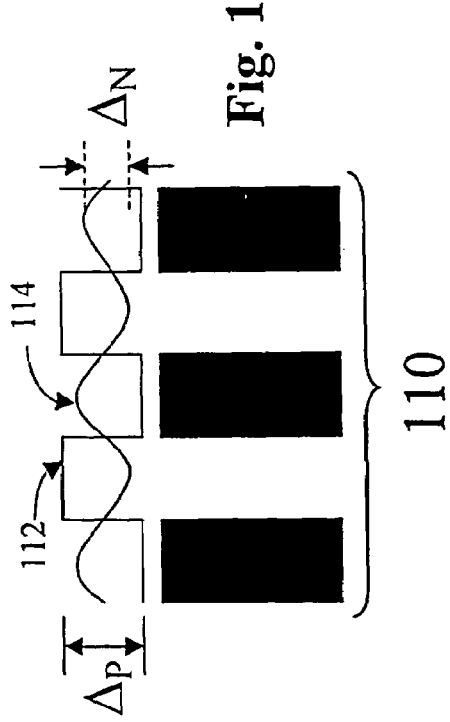
FIGS. 1 to 3 illustrate the characteristics of POV inks in terms of contrast as illuminated under visible light and fluorescent contrast when illuminated with fluorescent-exciting radiation, for a series of images (e.g., barcodes) with decreasing feature size from FIG. 1 to FIG. 3.

It is an object of the invention to provide a method for protecting documents from undetectable copying without authorization.

It is another object of invention to provide a method for protecting documents with fragile watermarks that can be sorted using high-speed equipment, without the need for costly forensic evaluation.

It is another object of invention to provide both methods and apparatus to deter unauthorized copying.

It is another object of invention to provide a simplified form of fragile watermark, which does not rely upon complex mathematical analysis to print or test for authenticity.

These and other objects are accomplished by the invention, which provides improvements in processing of documents to increase their security and/or decrease the complexity of testing for authenticity.

The invention comprises a method for printing a document with a security marking, a method for authenticating documents and an apparatus for authenticating documents. The method for printing a document with a security marking comprises: a) providing an ink capable of printing images which are visible both to viewing under white light and as fluorescent images when irradiated with ultraviolet light; and b) printing at least two image segments, the segments having features of different sizes, wherein the resolution of the relative sizes of the two image segments will provide a detectable difference in fluorescent image sharpness, preferably while the visible image of both image segments remain readable by machine. In one preferred embodiment, at least one image segment will have feature dimensions within the range of from about 50 to 200 μm and at least one image segment will have feature dimensions of at least about 100 μm, and the two image segments will have features that differ in feature dimension by at least about 50%, more preferably at least about 100%. The images are preferably printed with a POV ink. The products of this process are also new.

The method for authenticating printed documents comprises: a) obtaining at least one document having an image printed thereon comprised of at least two segments of different feature size, said image printed with an ink capable of printing images which are visible both to viewing under white light and as fluorescent images when irradiated with ultraviolet light; b) illuminating both image segments with both white light and ultraviolet light; c) measuring the positive and negative contrast for both image segments; d) comparing the measured contrast values for the segments to predetermined values; and f) based on the comparison, determining if the document is an original or if it is identified as a copy.

The apparatus, in one aspect will comprise: a) means for illuminating image segments of a document having two image segments; b) means for measuring the positive and negative contrast for both image segments; c) means for comparing the measured contrast values for the segments to predetermined values; and d) means for, based on the comparison, determining if the document is an original or if it is identified as a copy.

The method and the resulting products have a number of preferred aspects, many of which are described below and shown in the accompanying drawings.

DETAILED DESCRIPTION OF THE INVENTION

The invention relates to providing an added degree of security to printed documents by utilizing a property, typically found to be a disadvantage, of POV inks, namely, the inability of inks of this type to provide sharp negative contrast images. Typically, the negative contrast image of the POV inks will be blurred (e.g., as defined in ISO Standard No. ISO-IEC 13660—International Standard, Office Equipment—Measurement of image quality attributes for hardcopy output—Binary monochrome text and graphic images . . . 5.3.1 blurriness—The appearance of being hazy or indistinct in outline; a noticeable transition of blackness from background to character. The measure of blurriness is the average distance between the inner and outer boundary edges.). Black and other dark inks, however, tend to provide sharper positive contrast images with more clearly defined contrast between printed and unprinted areas. The invention utilizes the properties of the POV inks alone or with those of coprinted dark inks in a method that can be utilized to provide high-speed security screening of documents. The invention utilizes a detectable difference in fluorescent image sharpness that can be achieved by printing images in segments having differing feature sizes. This difference in sharpness can be observed for fluorescent images of predetermined dimension while, preferably, the visible image having the same image feature sizes can remain readable by machine.

For the purposes of the invention, the term "photosensitive optically variable" (POV) ink is meant to include inks that can produce a visible print that fluoresces when excited with a shorter wavelength light such as ultraviolet light. The patent documents identified in paragraph above describe representative suitable POV inks. As used herein, the POV inks of choice will preferably provide a printed image that is visually dark, e.g., black or dark gray, and contains machine-readable information-bearing marking that fluoresces in a specific wavelength range when excited with a shorter wavelength light. Images printed with POV inks exhibit visual light absorption throughout the entire visual spectrum including the red region of the visible spectrum where red inks are invisible to typical automatic scanning systems. These inks will achieve acceptable PCS (Print Contrast Signal) values on dark papers such as Kraft or Manila as well as on white and light-colored substrates. The Print Contrast Signal (PCS) is the ratio of the Print Reflectance Difference (PRD) and the substrate reflectance. The difference between the paper reflectance and ink reflectance is the PRD. The inks best suited for use with the invention will preferably provide PRD values of at least 30%, and more preferably of at least 40%, in the scanning region of interest when printing images of feature dimensions of at least about 10 µm, and more preferably of at least about 50 µm.

The POV inks of choice will produce a visible print that fluoresces when excited with a shorter wavelength light such as ultraviolet light. Visually dark areas appear dark under ordinary light, but then appear as bright areas under the proper illumination and provide contrast against the white or unprinted areas on the printed substrate, which appear dark. The strength of a fragile watermark printed with POV ink (i.e., its ability to be read) can be easily measured in visible light and by fluorescence. Inherently, the fluorescent images of the POV inks are less sharp than the visible images produced with the same ink at the same time. Fluorescent images printed with POV inks are characterized by reduced print quality, especially blurring, as compared to the visual images. This is easily observed by measuring the strength of an image printed with POV ink in visible light and by fluorescence. These characteristics of POV inks are utilized according to the invention for printing fragile watermarks, which according to the invention benefit from a predictable variation in contrast strength. The relative strengths measured for the watermark under the two conditions provides a signal that is difficult to duplicate.

Printing a fragile watermark with a two component ink, such as a POV ink, results in a security marking that is very difficult to reproduce. A scanner that measures the fragile watermark strength in both components (e.g., both in visible/reflected and fluoresced light) can be employed to automatically detect the difference of watermark strength in the two images. The scanner will almost certainly detect attempts to copy without requiring complex forensic investigation. However, it is within the scope of the invention to provide for a screening test that can be followed by intensive forensic evaluation. Indeed, this will very likely be the prudent course to follow where there is any significant value at stake.

Figure 2:
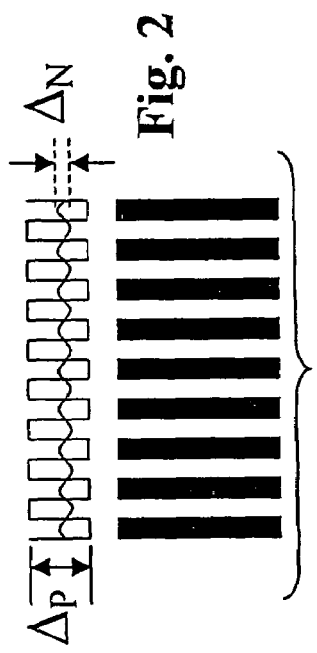
Figure 3:
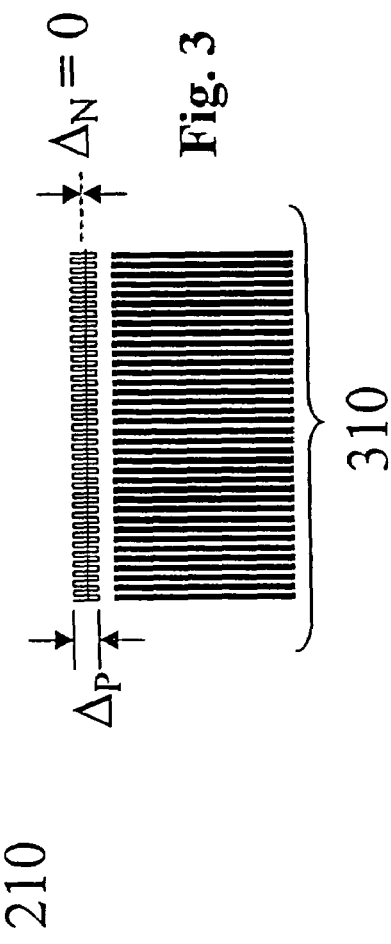

FIGS. 1 to 3 illustrate characteristics of POV inks in terms of both positive and negative contrast for a series of bar code images with decreasing image feature sizes from FIG. 1 to FIG. 3. The term negative contrast refers to the property of the fluorescent image being the reverse or negative of the visible image. Thus, where the dark printed ink is illuminated with white light, it appears as a positive image and the same image printed with a POV ink appears as the negative when illuminated with fluorescent-exciting radiation. The images 110, 210, and 310 are printed images (e.g., represented as bar codes) having visibility under illumination by both visible light and ultraviolet light. The invention entails printing a fragile watermark comprised of at least two image segments of different image feature size. The term "image feature size" will the size of discrete image segments, be they lines, dots or other shapes, that are arranged in a pattern comprising a plurality of such features spaced by substantially like sized unprinted areas. The barcodes shown in the illustrations are linear bars, but they could as easily be images of any shape or any type containing codes capable of being read in the horizontal and vertical directions. They can be comprised of any suitable arrangement of geometric elements, such as squares, dots or the like, capable of forming an image and preferably encoding digital information. The images need not be information encoding indicia, but can comprise advertising, decorative or other imaging.

FIG. 1 illustrates a simple image in the form of a vertical line barcode with a low frequency pattern 110, i.e., the feature size is relatively large, e.g., on the order of 250 µm or larger. The pattern 110 has a plurality of dark printed bars of significant line width with white spaces between the bars. The line 112 is representative of a graph of the reflectance of light from the different areas of the bar codes 110. In each instance used in the drawings, $\Delta$ denotes the difference in illumination between the printed areas and the unprinted areas. This is a value known as the PRD (Print Reflectance Difference) and provides an objective contrast value, expressed as a percentage. The PRD can express a value for positive contrast ($\Delta_P$) in the case of visible light or for negative contrast ($\Delta_N$) in the case of fluoresced light. Thus, where the ink is black and the illuminating light is white, the symbol $\Delta_P$ is used to denote positive contrast.

For example, in FIG. 1, the positive contrast $\Delta_P$ is a measure of the difference between the maximum and minimum reflectance of white light from a printed bar code area 110 having a low-frequency (large feature size, fewer features per unit length observed) bar code. The minimum PRD values on curve 112 are for areas where the bar code image is absorbing essentially the entire quantity of incident light, letting little be reflected. The maximum values on curve 112 are for areas of the bar code where the substrate, e.g., paper, is reflecting a high percentage of the incident light. Curve 112 is characterized by a relatively square shape, indicating sharp contrast for visible light between printed and unprinted areas. Where the printing technology is less precise, the substrate is more porous, or where the feature size is smaller (e.g., frequency is very high), the shape will be less square. Curve 114 shows values of PRD (negative contrast) for the fluorescent portion of the image printed with POV ink. The curve is rounded, indicating that the image has spread or that the emitted light is being scattered, or both effects.

There is less sharp contrast between printed and unprinted areas for the negative image than for the positive image. In the past, this has been viewed as a limitation of POV inks. The invention uses this property to advantage. The positive and negative images effective for use with the invention will preferably provide PRD values of at least 30%, and more preferably of at least 40%, in the scanning region of interest when printing images of feature dimensions of at least about 250 µm. The negative contrast will degrade significantly for images having feature sizes of less than about 50 to 100 µm. When, according to the invention, at least two image segments are printed having features of different sizes, this property can be used to advantage. Thus, in one preferred embodiment, at least one image segment will have feature dimensions within the range of from about 50 to 200 µm and at least one image segment will have feature dimensions of at least about 100 µm, and the two image segments will have features that differ in feature dimension by at least about 50%, more preferably at least about 100%. When these image segments are preferably printed with a POV ink, the difference in sharpness of the two image segments can be seen in the PRD values for negative and positive contrast.

FIG. 2 is similar to FIG. 1, but the feature size of the image elements of the bar code 210 is decreased. This results in a modest decrease in the positive contrast PRD ($\Delta_P$) but causes a great decrease in the negative contrast PRD ($\Delta_N$). The ratio of the positive contrast PRD to the negative contrast PRD decreases disproportionately with the feature size of elements in an image segment. Thus, where there is a decrease in the feature size (e.g., accompanied by an increase in the number of bars per unit of distance) of one segment of the barcode as compared to another segment of the barcode printed in a POV ink, the ratio of the positive contrast PRD ($\Delta_P$) to the negative contrast PRD ($\Delta_N$) will increase at a rate greater than the ratio of the feature sizes.

FIG. 3 is also similar to FIG. 1, but the image feature size of the bar code 310 is yet further decreased. This again results in a modest decrease in the positive contrast PRD ($\Delta_P$) but causes the negative contrast PRD ($\Delta_N$) to decrease to almost zero, and the graph of the PRD to distance is essentially a straight line. In a preferred form of the invention, feature sizes of at least one image segment will be decreased to provide a negative contrast PRD ($\Delta_N$) of less than 20%, more preferably less than 10%, while the PRD of the positive dark image will remain at least 30%, and preferably greater than 40%.

Figure 4:
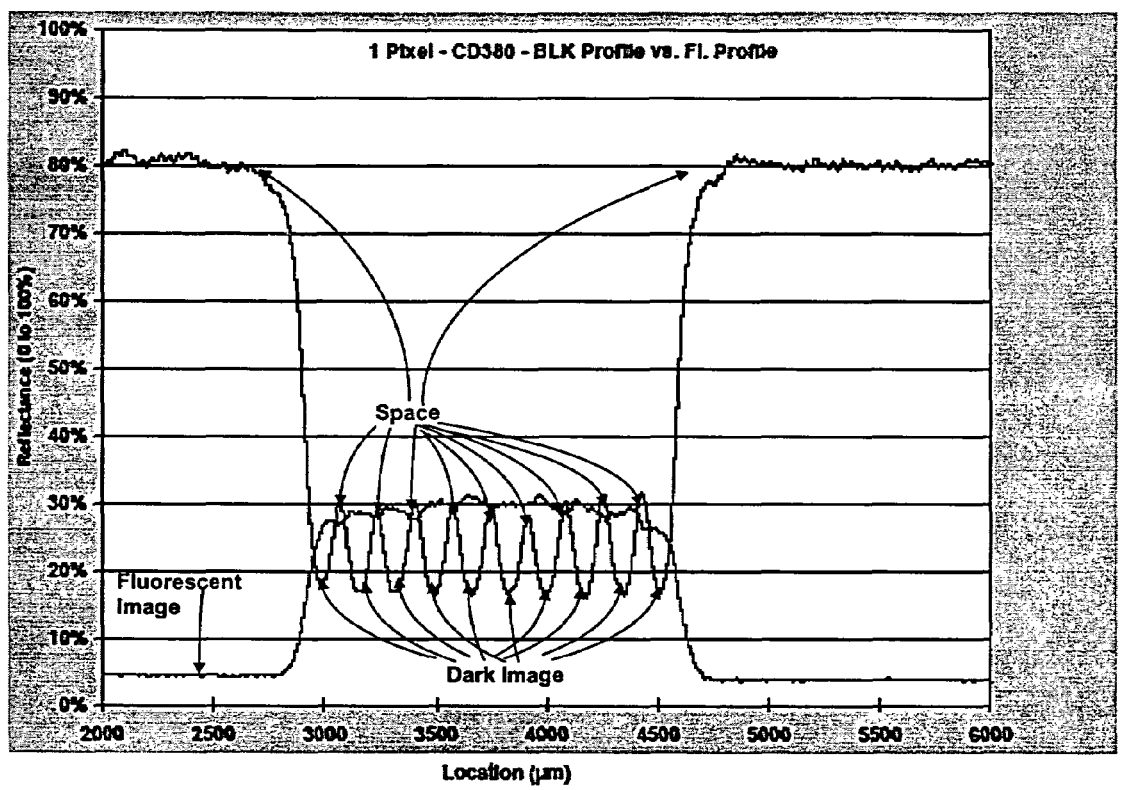
FIGS. 4 to 6 are graphs comparing reflectance for white light and fluorescence for images of alternating lines and spaces (as in a barcode) with sizes increasing from a width of one pixel lines and spaces in FIG. 4 to 6 pixel-wide lines and spaces in FIG. 6.
Figure 5:
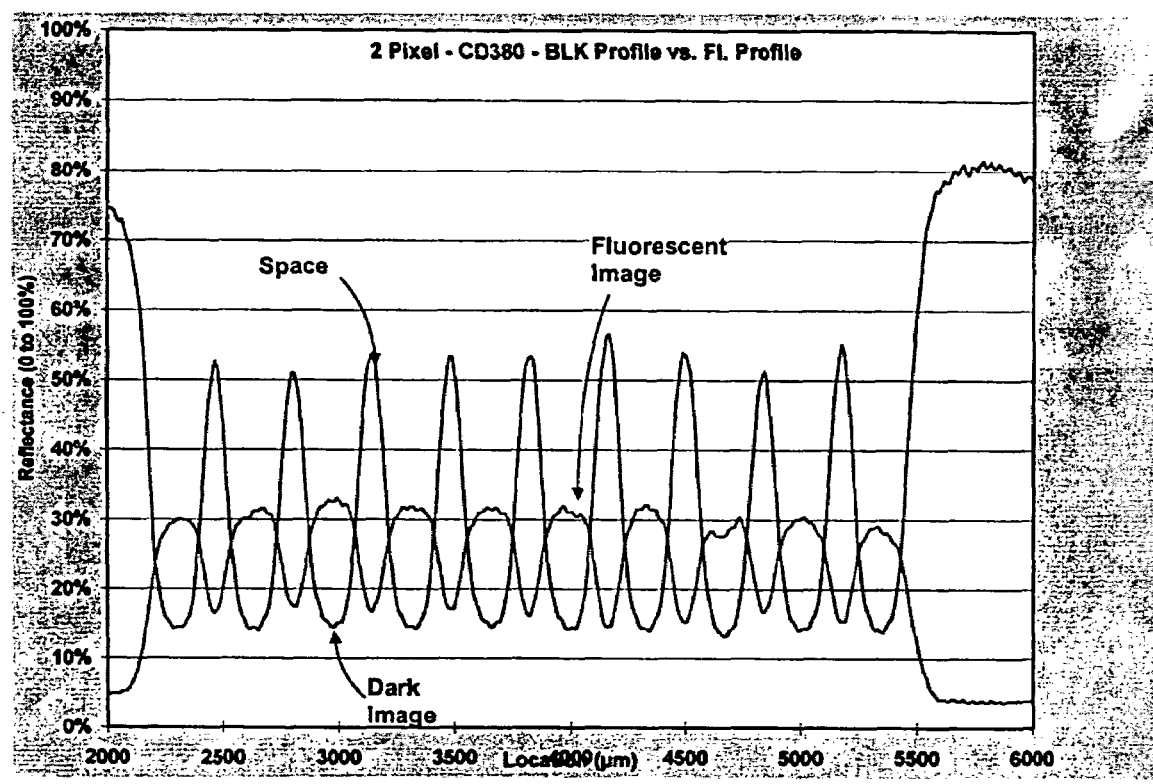
Figure 6:
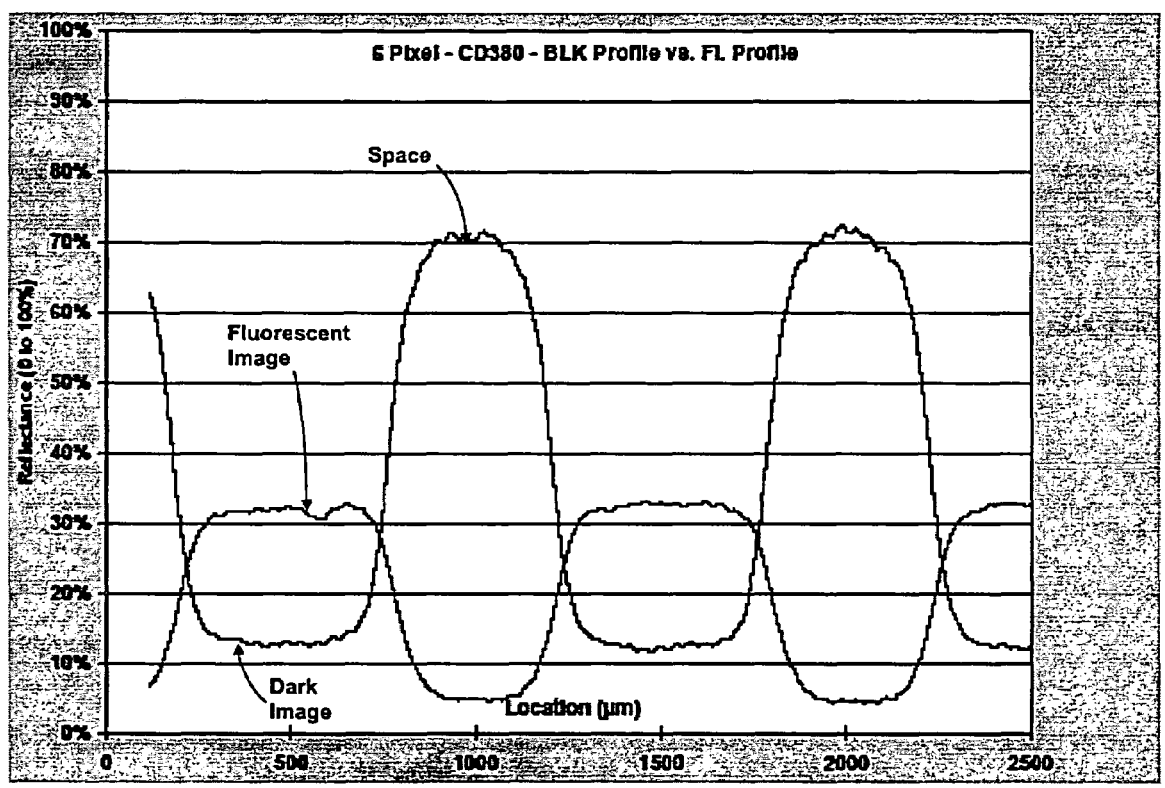
Figure 9:
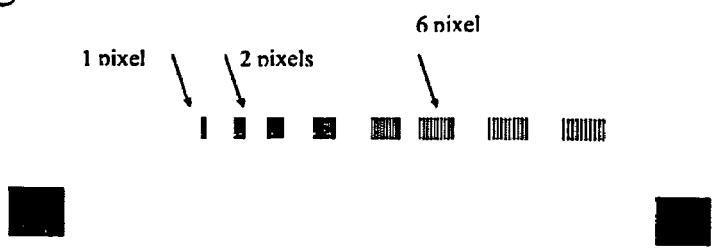
FIG. 9 shows a test pattern as used to obtain the data graphed in FIGS. 4 to 6.

Reference is now made to FIGS. 4 to 6, which are graphs comparing reflectance for white light and fluorescence for images of alternating lines and spaces (as in a barcode) with sizes increasing from a width of one pixel for both lines and spaces in FIG. 4 to 6 pixel-wide lines and spaces in FIG. 6. These three graphs were prepared from data gathered from three separate prints made with a black, red-fluorescent POV ink. A composite test image (illustrated in FIG. 9) was generated in Adobe Photoshop 7.0 and was printed on office copy paper using an Epson C82 printer at 2880×720 DPI. The image was generated at 360 DPI and contained features such that the line width and space widths in each grouping were equal.

Alternate bands of printed image and of blank office copy paper substrate were printed with the following image feature sizes:

| FIG. | Printed Band Width | Blank Band Width |
| --- | --- | --- |
| 4 | 1 Pixel (80 µm) | 1 Pixel (80 µm) |
| 5 | 2 Pixels (160 µm) | 2 Pixels (160 µm) |
| 6 | 6 Pixels (480 µm) | 6 Pixels (480 µm) |

Figure 10:
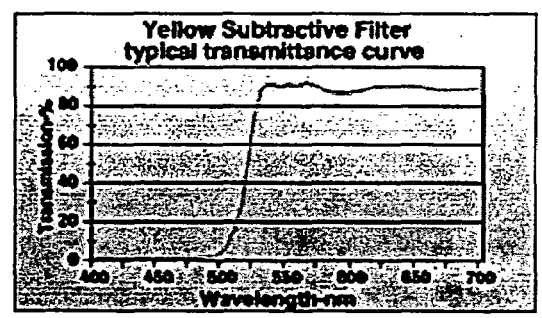
FIG. 10 shows a typical transmittance curve for the test to obtain the data graphed in FIGS. 4 to 6.

The image was placed in a QEA (Quality Engineering Associates) IAS-1000 system configured with a color camera. The system was calibrated using the "A-D Cal" program in the supplied software. A yellow subtractive filter was installed on the camera (typical characteristics of the filter are shown in FIG. 10). The instrument was operated in "normal" mode with white fluorescent illumination. The software was used to measure various print quality parameters as defined by ISO13660 standard. Reflectance vs. position data was also captured and a profile generated. The fluorescent lights were turned off and replaced with Short UV lamps (254 nm). The image was then illuminated with the ultraviolet lamps creating red fluorescent emission. The yellow subtractive filter blocks the blue fluorescent emission from the optical brighteners in the envelope and improves the signal to noise ratio (contrast). Without changing the position of the sample, print quality attributes were measured again. The positive (Fluorescent lighting) and negative (UV lighting) print quality attributes were then directly compared. Reflectance values were noted at regular increments (about 12 µm) across the image and the positive reflectance values were plotted giving the larger, darker line in the figures.

In FIG. 4, the envelope white space is shown at locations of from 2000 µm to about 2800 µm and on the other side of the graph at form about 4500 µm and above. Only the dark lines viewed with white light are distinguishable by the data presented in the graph. The print from which the data was generated comprised alternating lines and spaces of a width of one pixel, e.g., about, 80 µm. The dark image shows little reflectance, and the contrast between printed and space areas is clearly distinguishable. The fluorescent image on the other hand does not provide significant resolution at this image feature size. The line representing fluorescence goes from a minimum in the unprinted areas (under about 2800 µm and over about 4500 µm) to a maximum in the vicinity of the image, but remains relatively constant at about 30%. The data for the fluorescent image cannot distinguish between printed lines and blank spaces at this resolution under the conditions used for preparing the print.

In FIG. 5, the dark image curve is labeled as is the fluorescent image curve. These curves are based, as indicated in the table above, on bars and spaces having widths of 2 pixels or about 160 µm in dimension. More clear resolution is seen for the fluorescent image.

Similarly, FIG. 6 shows graphs obtained from positive and negative reflectance values for bars and blank spaces, but this time having dimensions of about 6 pixels across, i.e., about 480 µm. Here, the fluorescent image is yet more clear.

The invention takes advantage of these phenomena and provides improvements in processing of documents having images including visible features that are also visible as fluorescing images. Images of this type printed with POV inks, such as described, can increase security while preferably not significantly increasing printing or scanning complexity to enable testing for authenticity. Below we describe both a method for printing a document with a security marking, a method for authenticating documents. Also described is an apparatus for authenticating documents.

The methods of the invention enable printing a document with a security marking and for authenticating such documents. The method for printing a document with a security marking comprises: a) providing an ink capable of printing images which are visible both to viewing under white light and as fluorescent images when irradiated with ultraviolet light; and b) printing at least two image segments, the segments having features of different sizes, where in the relative sizes of the two image segments will provide a detectable difference in fluorescent image sharpness, preferably while the visible image of both image segments remain readable by machine. In one preferred embodiment, at least one image segment will have feature dimensions within the range of from about 50 to 200 µm and at least one image segment will have feature dimensions of at least about 100 µm, and the two image segments will have features that differ in feature dimension by at least about 50%, more preferably at least about 100%. The images are preferably printed with a POV ink. The products of this process are also new.

The method for authenticating printed documents comprises: a) obtaining at least one document having an image printed thereon comprised of at least two segments of different feature size, said image printed with an ink capable of printing images which are visible both to viewing under white light and as fluorescent images when irradiated with ultraviolet light; b) illuminating both image segments with both white light and ultraviolet light; c) measuring the positive and negative contrast for both image segments; d) comparing the measured contrast values for the segments to predetermined values; and f) based on the comparison, determining if the document is an original or if it is identified as a copy.

The apparatus, in one aspect will comprise: a) means for illuminating image segments of a document having two barcode segments; b) means for measuring the positive and negative contrast for both image segments; c) means for comparing the measured contrast values for the segments to predetermined values; and d) means for, based on the comparison, determining if the document is an original or if it is identified as a copy.

The apparatus, in one aspect will comprise means for illuminating barcode segments of a document having two barcode segments. Following illumination at one station or zone, means are also provided for measuring the positive and negative contrast for both barcode segments. To determine if the measured values are indicative of an original or an unauthorized copy means are also provided for comparing the measured contrast values for the segments to predetermined values and for, based on the comparison, determining if the document is an original or if it is identified as a copy.

Figure 7:
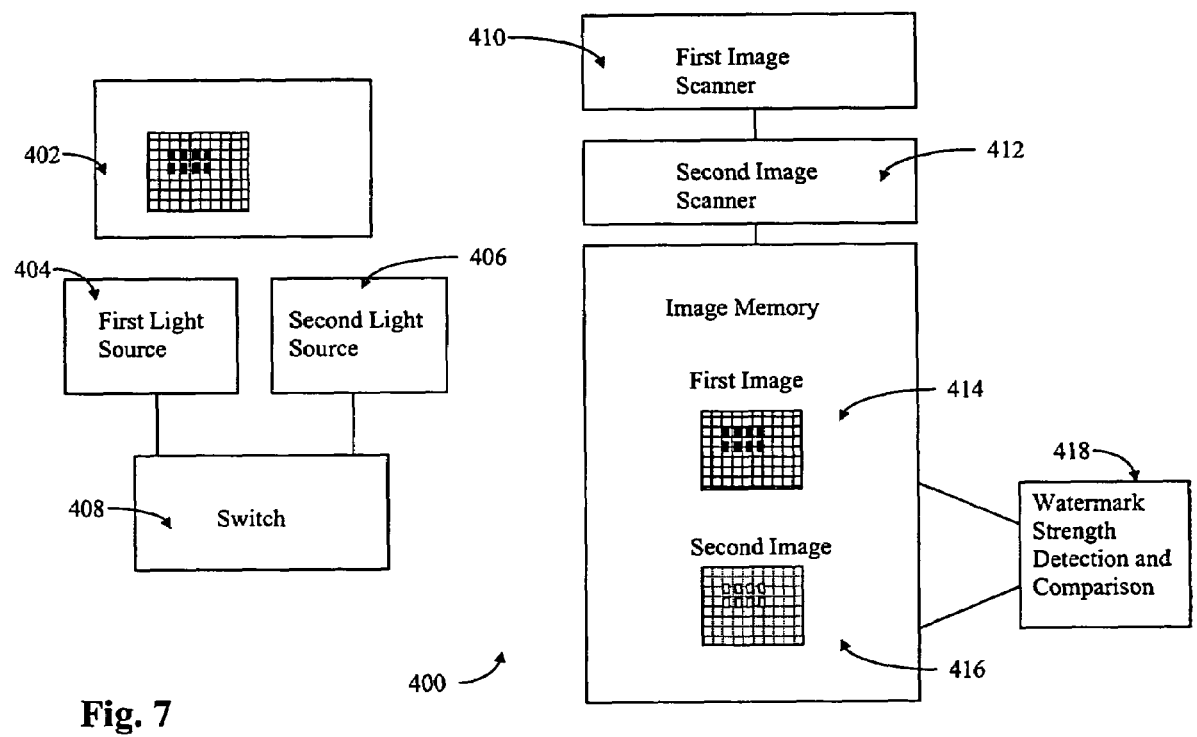
FIG. 7 shows a system for comparing the strength of the fragile watermark signal produced by inks, e.g., POV inks, having the capability of producing images readable in both positive contrast and fluorescent image strength.

FIG. 7 shows a system 400 for comparing the strength of the fragile watermark signal, such as produced by differential penetration of components of the ink. Where, as just described, the watermark comprises an image such as a barcode having at least two segments of different image feature size, each of the barcode segments will provide a signal representative of contrast strength when the watermark is viewed under visible and ultraviolet light. Each of the segments will be illuminated with visible and ultraviolet light and will each produce first and second images. Any pair of visible and fluorescent images printed as described can be utilized for the comparison of the invention.

The ink in image 414 is preferably the POV ink described in the prior applications, although it may be an ink with two color components or any other detectable feature, preferably as long as the visual light and fluorescent emission discrimination characteristics of the two components are different. The image 414 can be a fragile watermark as described in the prior applications identified in paragraphs [0005], [0006] and [0007], although any image or pattern that enables automatic detection of the change in image sharpness and print growth is applicable. For fragile watermarks, there are known methods (described in the above-cited patent publications) of detecting copying that are sensitive to the print growth and blurring common in copying. With variation to provide for visible light and fluorescent scanning according to the invention, the methods described in the published applications referenced above can be modified for detecting the difference in strengths. For example, the amount of strength between the first image and the second image for the large image feature size component of the watermark and between the first image and the second image for the small image feature size component of the watermark in the comparator 418. Alternatively, a test pattern is printed and the relative strengths of the Fourier components of the first and second images provide a signature of the authenticity of the image in the comparator 418. For a POV ink solution, the second light source 406 is the fluorescence exciting light, which is preferably ultraviolet, while the first light source 404 is visible light.

The two image scanners 410 and 412 may be the same physical device or may be distinct devices with different spectral sensitivity to enhance detection of the corresponding images. Each scanner can be activated when the corresponding light source is activated. The scanners should be equipped with suitable software to recognize and distinguish image components intended for separate evaluation, e.g., low and high frequency barcode components. In preferred forms, the equipment will be constructed out of readily available components of known design. The scanners will operate at rates commensurate with high speed facer-canceller equipment, typically at rates of from 500 to 600 pieces per minute, preferably with an accuracy of at least 98%.

In an alternative embodiment, means are provided for simultaneous detection of the two images. An example is watermark printed with POV ink that absorbs in blue and fluoresces in the red when excited with blue or ultraviolet light. The scanner 410 is sensitive in the blue and scanner 412 is sensitive in the red. Light sources 404 and 406 could be a single light source.

Figure 8:
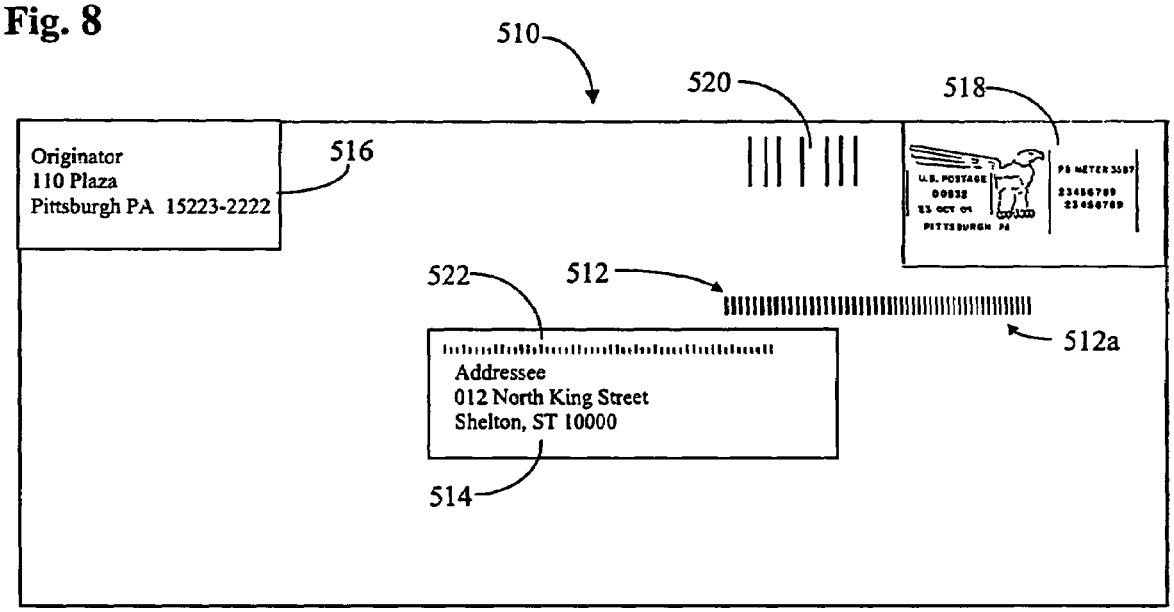
FIG. 8 schematically illustrates a mailpiece, which includes a 2-D bar code comprising segments that can be printed in POV or other ink having the capability of producing images readable under different light sources.

FIG. 8 schematically illustrates a mailpiece 510, which employs exemplary watermarks printed as simple two segment barcodes or as IBI images comprising human readable information and two-dimensional (2-D) bar code information. (For a definition of an IBI image, see for example, USPS published IBI specifications: PERFORMANCE CRITERIA FOR INFORMATION BASED INDICIA PROGRAM, dated Feb. 23, 2000.) The composite images can include redundant information. Mailpiece 510 includes a 2-D bar code comprising segments 512 and 512a, which can be printed in POV or other ink having the capability of producing images readable under different light sources, along with conventionally printed address 514, 516 and postage information 518 and an optional Facing Identification Mark (FIM) 20, typically printed in black ink. According to one preferred form of the invention, the barcodes segments 512 and 512a are printed with different frequencies (image feature sizes), typically within the range of from 50 to 250 μu in dimension. One of the barcode segments 512 and 512a will have image feature sizes within this range but at least 50% higher than the other, and preferably at least 100% higher than the other. In all cases the barcode segments should be machine readable when exposed to visible light. In other words, it is important that both barcode segments 512 and 512a be readable as dark images. Where both are printed with a POV ink or equivalent, the fluorescent image for one of the image segments 512 and 512a need not be machine readable, while the other one should be. All illustrated "image segments" are with black and white images. However, this term is meant to include other formats. For example, the different wavelength features can be gray scale features, if the printer supports dithered or variable drop size gray scale. An image segment is any part of an image. A feature is a variation in the gray scale of the image. The feature dimension is the typical length over which the gray scale varies.

The FIM 520 is currently required by United States Postal Service IBI Specifications to be part of the IBI image so that the USPS Advanced Facer Canceller may detect the presence of an IBI mailpiece so as to sort the mailpiece properly.

The address block 514 of a mailpiece is the primary source of address information and contains a human-readable address and preferably includes a Delivery Point Bar Code (DPBC), shown schematically as 522.

The two segments of 2-D bar codes, schematically illustrated as 512 and 512a, are preferably codes capable of being read in the horizontal and vertical directions. To achieve this objective, they are comprised of arranged geometric modules, such as squares, capable of encoding digital information. Typically, the modules forming a 2-D bar code image block are square and solidly imprinted, but can be of other effective configurations.

The 2-D bar code image segments as illustrated as 12 and 12a, are preferably printed with POV ink of the type described in the above-identified applications of Judith D. Auslander, et al., and are conveniently printed by ink jet print means.

In this manner, the invention provides fragile watermarks including both high frequency components that are difficult to undetectably duplicate and utilizes POV inks to make this task practically impossible. It also enables high speed processing to detect unauthorized copies. The invention is simple in operation because the equipment needed is quite simple and easily assembled. A detector, which can be operated at high speeds, measures the strength of the high frequency components and can detect most copies.

As described above, the invention solves the problem of detecting attackers reproducing security markings. Even with a high-resolution scanner and the time and resources to reverse engineer the watermarks of the invention, an attacker will still find it difficult to counterfeit or otherwise make illicit copies of a document protected with a fragile watermark of the invention.

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

The invention claimed is:

1. A method for printing a document with a security marking comprising:
   a) providing an ink for printing images which are visible both to viewing under white light and as fluorescent images when irradiated with ultraviolet light; and
   b) printing at least two image segments, the image segments having features of different sizes, wherein the sizes of the two image segments will provide a detectable difference in fluorescent image sharpness.

2. The method according to claim 1 wherein the visible image of both image segments are readable by machine.

3. The method according to claim 1 wherein at least one image segment will have feature dimensions within the range of from about 50 to 200 μm and at least one image segment will have feature dimensions of at least about 100 μm, and the two image segments will have features that differ in feature dimension by at least about 50%.

4. The method according to claim 3 wherein, the two image segments will have features that differ in feature dimension by at least about 100%.

5. The method according to claim 1 wherein the two image segments are printed with a Photosensitive Optically Variable (POV) ink.

6. A method for authenticating printed documents comprises:
   a) obtaining at least one document having an image printed thereon comprised of at least two image segments of different feature size, said image printed with an ink for printing images which are visible both to viewing under white light and as fluorescent images when irradiated with ultraviolet light;
   b) illuminating both image segments with both white light and ultraviolet light;
   c) measuring a positive and negative contrast for both image segments;
   d) comparing the measured contrast values for the image segments to predetermined values; and
   e) based on the comparison, determining if the document is an original or if the document is identified as a copy.

7. An apparatus for testing a document printed with a security marking comprising:
   a) means for illuminating image segments of a document having two barcode segments;
   b) means for measuring a positive and negative contrast for both image segments;
   c) means for comparing the measured contrast values for the image segments to predetermined values; and
   d) means for, based on the comparison, determining if the document is an original or if it is identified as a copy.

8. A printed document with a security marking, comprising:
   at least two image segments printed with an ink for forming images which are visible both to viewing under, white light and as fluorescent images when irradiated with ultraviolet light, the image segments having features of different sizes,
   wherein the sizes of the two image segments will provide a detectable difference in fluorescent image sharpness.

* * * * *